July 20, 1948.  W. C. TRAUTMAN  2,445,544
FLOW-REGULATING VALVE
Filed Feb. 16, 1945

INVENTOR.
W. C. TRAUTMAN
BY Ellwoodbury
ATTORNEY

Patented July 20, 1948

2,445,544

UNITED STATES PATENT OFFICE 2,445,544

FLOW-REGULATING VALVE

Walter C. Trautman, Los Angeles, Calif., assignor to Bendix Aviation Corporation, South Bend, Ind., a corporation of Delaware Application February 16, 1945, Serial No. 578,265

8 Claims. (Cl. 137—152.5)

This invention relates to flow-regulating valves for maintaining at least approximately constant fluid flow in a line, irrespective of pressure changes in the source of fluid and of changes in the resistance to flow through the line.

An object of the invention is to provide a relatively simple and reliable valve structure for maintaining relatively constant flow.

Another object is to prevent a rise of pressure in the supply line when the flow permitted by the regulator valve is less than the capacity of the source.

Another object is to provide a flow-regulating valve that is capable of adjustment to vary the rate of flow.

Another object is to provide a flow-regulating valve for receiving pressure liquid from a source, such as a pump, and delivering a portion of the fluid to a line at a substantially constant rate of flow, while returning any excess fluid back to a reservoir at low pressure.

Still another object is to provide a flow-regulating valve of the type described in the preceding paragraph in which the valve is self-restoring to connect the source of pressure to the low pressure reservoir when no pressure is existent in the source, and to then automatically shift, in response to supply of pressure fluid from the source, to deliver the desired flow to the line while returning only the excess flow to the reservoir.

Various other more specific objects and features of the invention will become apparent from the detailed description to follow.

Briefly, the valve of the present invention consists of a casing having an inlet passage adapted to be connected to a source of pressure fluid, a line fluid passage adapted to be connected to a line which is to receive a constant flow, and an exhaust passage adapted to be connected to an exhaust line or reservoir return line, with a suitable automatic valve mechanism for inversely throttling flow from the inlet passage to the line fluid passage and to the exhaust passage, respectively, in such a way as to maintain the desired flow in the line so long as the desired flow is equal to or less than the flow supplied to the inlet passage. The valve mechanism preferably consists of a pair of valve members interconnected by a common stem extending through a straight section of the inlet passage, one valve member moving toward one end orifice of the inlet passage to increasingly throttle fluid flow therefrom while the other valve member moves away from the other end orifice of the inlet passage to decreasingly throttle fluid flow therethrough. This valve construction variably proportions the distribution of fluid flow from the inlet passage between the line passage and the exhaust passage, without materially changing the total resistance to flow of fluid from the source into the inlet passage. The valve is extended through the wall of the exhaust passage into a cylinder and is secured to a piston in the cylinder, the piston constituting the actuating member for the valve.

The piston itself is made responsive to variations in flow through the line passage, and it responds to actuate the valves in such a way as to compensate for changes in the flow. Thus, one end of the cylinder is connected to the inlet end of the line fluid passage so that it is exposed to the full pressure existing in the line, whereas the other end of the cylinder is connected to the throat of a Venturi passage in the line fluid passage.

As is well known, the pressure at the throat of a Venturi passage is less than at other points in the line by an amount proportional to the rate of flow. The connections are such that if the flow is reduced, causing the pressure at the throat of the venturi to rise relative to the pressure at other points in the line, the piston is moved in direction to decreasingly throttle the flow to the line while increasingly throttling the flow to the exhaust passage, and vice versa.

In accordance with the invention, I also form the Venturi passage by means of a tapered plug member axially adjustable in a tapered section of the line passage to produce an annular throat passage which can be varied in area to vary the desired rate of flow in the line.

In the drawing

Figure 1:
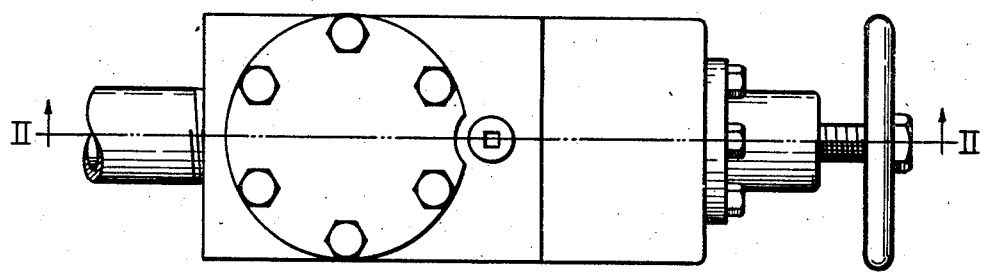
Fig. 1 is an external plan view of one embodiment of the invention.
Figure 2:
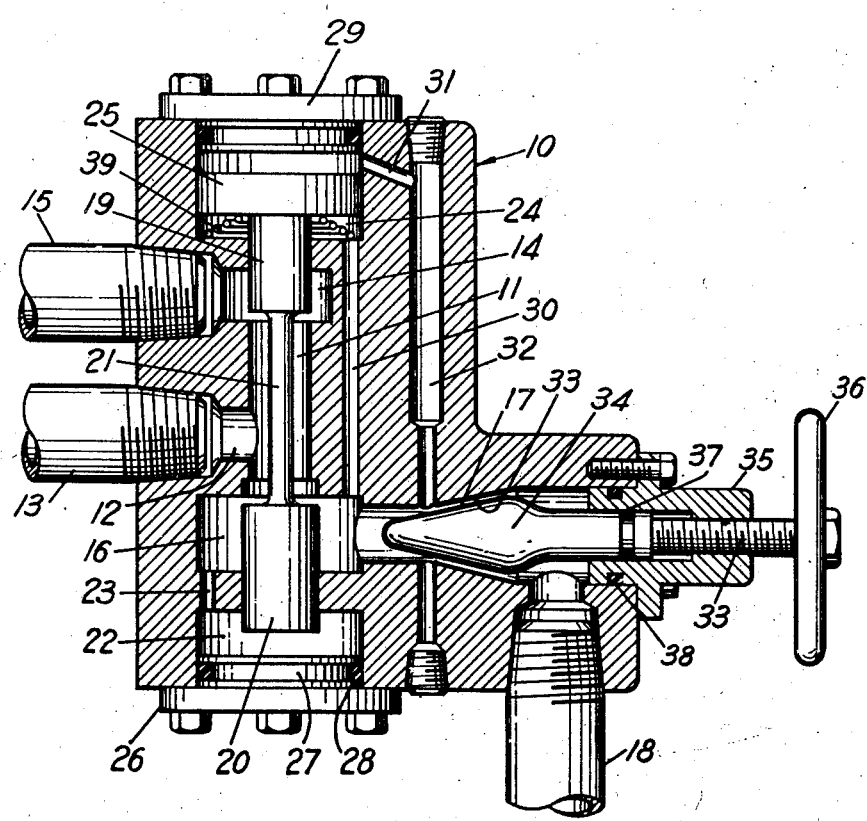
Fig. 2 is a vertical section taken in the plane II—II of Fig. 1.

As shown in the drawing, the device comprises a body 10, which may be a casting having suitable passages machined or otherwise formed therein. Thus, the body has a cylindrical inlet passage 11 extending vertically (Fig. 2) therewithin and connected intermediate its ends to a lateral passage 12, the outer end of which is threaded to receive a fitting on the end of a supply pipe or line 13 adapted to be connected to a pump or other source of fluid under pressure. The upper end of the inlet passage 11 communicates with an exhaust passage 14, which is connected by a suitable fitting to an exhaust line 15 extending to a reservoir or to a waste line depending upon whether or not exhausted fluid is to be preserved. The lower end or orifice of the inlet passage 11 communicates with a line passage 16 which is connected through a Venturi passage 17, and suitable threaded fittings to a line 18 to which a constant fluid flow is to be supplied.

Fluid flow from the inlet passage 11 to the exhaust passage 14 is throttled by a piston valve 19, and fluid flow from the passage 11 to the line passage 16 is throttled by a piston valve 20, the valves 19 and 20 being interconnected by a stem 21 extending through the inlet passage 11, so that the two valves move in unison. Valve 20 is guided for sliding movement in a bearing provided therefor in the lower wall of the line passage 16. The valve 19 is similarly guided in a bearing in the upper wall of exhaust passage 14. The lower end of the piston valve 20 projects into a chamber 22 which is connected by a passage 23 to the line passage 16. The piston valve 19 projects into a cylinder 24 and is connected to a piston 25 in that cylinder. The lower end of the chamber 22 is closed by a plate 26 bolted on to the body 10 and having an inwardly extending portion containing an annular groove 27 in which a sealing ring 28 is positioned. The upper end of cylinder 24 is similarly closed by a closure plate 29.

The piston 25 is of substantially larger cross-sectional area than the valve members 19 and 20, and is exposed to pressures, the relative values of which vary with a variation in the rate of flow through the line passage. Thus, the lower end of the cylinder 24 is connected by a passage 30 to the line passage 16 and the upper end of cylinder 24 is connected by passages 31 and 32 to the Venturi passage 17.

It will be observed that the Venturi passage 17 is defined by a conical or tapered wall 33 in the body 10 and a conical or tapered plug 34, which is supported in axially adjustable concentric relation to the tapered wall 33. Thus, the tapered plug 34, is secured to a threaded stem threaded in a supporting bracket 35 which is bolted to the body 10. A hand wheel 36 on the outer end of the threaded stem 33 is provided for rotating the stem to move the tapered plug axially. A fluid seal is maintained between the plug 34 and the bracket 35 by a seal 37 and between the bracket 35 and the body 10 by a seal 38.

The structure functions as follows:

When there is no pressure fluid being supplied to the device through the line 13, the piston and valve assembly is maintained in uppermost position by a spiral helical spring 39 compressed between the lower end of cylinder 24 and the piston 25. In this position, the valve 20 closes off the lower end of the inlet passage 11, while the valve 19 permits substantially unrestricted flow from the upper end of the inlet passage 11 into the exhaust passage 14 and out through the exhaust line 15. However when fluid under pressure is being applied, the full pressure of fluid existing in the inlet passage 11 is applied to the upper end of the valve 20, whereas the pressure applied to the lower end of the valve 19 is substantially less because of the size of the exhaust passage 14 and the relatively unrestricted flow therefrom into the exhaust line 15. Therefore, the valve and piston assembly is moved down against the force of the spring 39 to permit fluid flow through the line passage 16 and the Venturi passage 17 to the line 18.

Thereafter, the full pressure in the line passage 16 is applied through passage 30 to the under side of piston 25, whereas the upper side of the piston is exposed to the lesser pressure applied through passages 31 and 32 from the Venturi passage 17. When the fluid flow to the line 18 is of the desired magnitude corresponding to the position of the plug 34, the piston and valve assembly assumes a position in which the lesser pressure applied to the upper end of piston 25 balances the greater pressure applied to the under side thereof. This balance exists because of the difference in effective areas of the upper and lower sides of the piston 25 caused by the presence of the valve 19, which functions as a piston rod in the cylinder 24. The spring 39 is relatively light, so that although it is able to move the piston and valve assembly into upper end position when no pressure fluid is being supplied, its force is small as compared to the forces developed by the fluid on piston 25. Of course, the pressure fluid applied to the valves 19 and 20 also has some effect, but the effect is simply additive to that of the pressure fluid supplied to the lower end of cylinder 24 through passage 30.

If anything occurs to vary the flow in the line 18, such as an increased resistance in the line 18, or a variation in the pressure in the supply line 13, there is a relative change in the pressures applied to opposite sides of the piston 25, which shifts the valve assembly in a direction to restore the desired rate of flow through line 18. Thus, if the flow increases, the pressure in the Venturi passage 17 decreases, and the piston and valve assembly moves upwardly to increasingly throttle flow of fluid from the inlet passage 11 to the line passage 16 and decreasingly throttle flow from the inlet passage 11 to the exhaust passage 14. When this movement has continued sufficiently to restore the line fluid flow to nearly its normal value, the normal pressure relation on opposite sides of the piston 25 is substantially restored, and the compensating movement of the valve assembly ceases. A decrease in the rate of flow in the line 18 increases the pressure applied to the upper side of piston 25 causing it to move down to increasingly throttle the fluid flow to the exhaust passage and decreasingly throttle the fluid flow to the line passage, until equilibrium is again reached.

As shown in the drawing, valve 20 is slightly larger than valve 19, and the lower end of the inlet passage 11 is correspondingly enlarged. This is not always necessary, but may be desirable in some instances to insure prompt opening of the valve 20 when pressure fluid is first supplied through the line 13. At this time, the valve 20 closes the lower end of passage 11, and the pressure within the inlet passage is effective over the larger area of the valve 20, as compared with valve 19, to promptly move the valve assembly into an intermediate position as shown in the drawing. After valve 20 has opened, its large diameter makes no difference in the operation of the valve because the increased area of the upper end of the valve is balanced by corresponding increase in the area of the lower end of the valve and both ends are exposed to the same pressure when the valve is open.

I claim:

1. In a flow-regulating valve: a casing defining an inlet passage adapted to be connected to a source of pressure fluid, a line fluid passage extending from said inlet passage and adapted to be connected to a line for delivering a regulated flow of fluid thereto, and an exhaust passage also extending from said inlet passage and adapted to be connected to an exhaust line; valve means movable in either direction for inversely throttling fluid flow from said inlet passage to said line fluid passage and from said inlet passage to said exhaust passage respectively; piston means for actuating said valve means; Venturi means in said line fluid passage for producing a reduced pressure in response to fluid flow through said line fluid passage; means for applying pressure from said line fluid passage to one side of said piston means to urge it in direction to increasingly throttle fluid flow to said line passage; and means for applying said reduced pressure produced by said Venturi means to the other side of said piston means.

2. A flow-regulating valve as described in claim 1 in which said Venturi means comprises: a tapered section in said line fluid passage expanding in the direction of flow, a tapered valve member concentrically positioned within said tapered passage section and means for longitudinally adjusting said tapered valve member to vary the width of the fluid path between the valve member and said tapered fluid passage section, whereby the magnitude of the pressure reduction produced by said Venturi means can be varied.

3. A flow-regulating valve as described in claim 1 including spring means normally urging said valve and piston means into that end position in which maximum throttling effect is produced in the line fluid passage and minimum throttling effect is produced in the exhaust passage.

4. A flow-regulating valve as described in claim 1 in which said inlet passage is a straight passage having an orifice at one end communicating with said line fluid passage and having an orifice at the other end communicating with said exhaust passage, and said valve means comprises a pair of valve members interconnected by a stem extending longitudinally through said inlet passage whereby movement of the valve means in one direction moves one of said valve members against one of said orifices while moving the other valve member away from the other of said orifices and vice versa, whereby fluid pressure in said inlet passage tends to maintain said valve means in position in which both valve members are displaced from their associated orifices.

5. A flow-regulating valve as described in claim 1 in which said inlet passage is a straight passage having an orifice at one end communicating with said line fluid passage and having an orifice at the other end communicating with said exhaust passage, and said valve means comprises a pair of valve members interconnected by a stem extending longitudinally through said inlet passage whereby movement of the valve means in one direction moves one of said valve members against one of said orifices while moving the other valve member away from the other of said orifices and vice versa, whereby fluid pressure in said inlet passage tends to maintain said valve means in position in which both valve members are displaced from their associated orifices, and spring means urging said valve means into that end position in which the valve member throttling fluid flow to said line passage is adjacent its associated orifice.

6. A flow-regulating valve as described in claim 1 in which said inlet passage is a straight passage having an orifice at one end communicating with said line fluid passage and having an orifice at the other end communicating with said exhaust passage and said valve means comprises a pair of valve members interconnected by a stem extending longitudinally through said inlet passage whereby movement of the valve means in one direction moves one of said valve members against one of said orifices while moving the other valve member away from the other of said orifices and vice versa, whereby fluid pressure in said inlet passage tends to maintain said valve means in position in which both valve members are displaced from their associated orifices, that valve member which throttles fluid flow to said exhaust passage being extended through the wall of said by-pass passage in sealing relation therewith and connected to said piston exterior of said exhaust passage, and the other valve member being exposed on its outer end to the fluid pressure in said line fluid passage.

7. A flow-regulating valve as described in claim 1 in which said inlet passage comprises a passage having a first orifice at one end communicating with said line fluid passage and having a second orifice at the other end communicating with said exhaust passage, and said valve means comprises a pair of valve members interconnected by a stem extending longitudinally through said inlet passage, whereby movement of the valve means in one direction moves one of said valve members against one of said orifices while moving the other valve member away from the other of said orifices and vice versa, said first orifice and its associated valve member being larger than said second orifice and its associated valve member, whereby the fluid pressure in said inlet passage acting directly upon said valve members tends to move said valve members in direction to open said first orifice and close said second orifice.

8. A flow-regulating valve as described in claim 1 in which said inlet passage comprises a passage having a first orifice at one end communicating with said line fluid passage and having a second orifice at the other end communicating with said exhaust passage, and said valve means comprises a pair of valve members interconnected by a stem extending longitudinally through said inlet passage, whereby movement of the valve means in one direction moves one of said valve members against one of said orifices while moving the other valve member away from the other of said orifices and vice versa, said first orifice and its associated valve member being larger than said second orifice and its associated valve member, whereby the fluid pressure in said inlet passage acting directly upon said valve members tends to move said valve members in direction to open said first orifice and close said second orifice, and spring means normally urging said valve means in direction to close said first orifice and open said second orifice.

WALTER C. TRAUTMAN.

REFERENCES CITED

The following references are of record in the file of this patent:

UNITED STATES PATENTS

| Number    | Name    | Date           |
|-----------|---------|----------------|
| 1,467,522 | Amsler  | Sept. 11, 1923 |
| 1,934,758 | Temple  | Nov. 14, 1933  |
| 2,167,837 | Hall    | Aug. 1, 1939   |